UNITED STATES PATENT OFFICE.

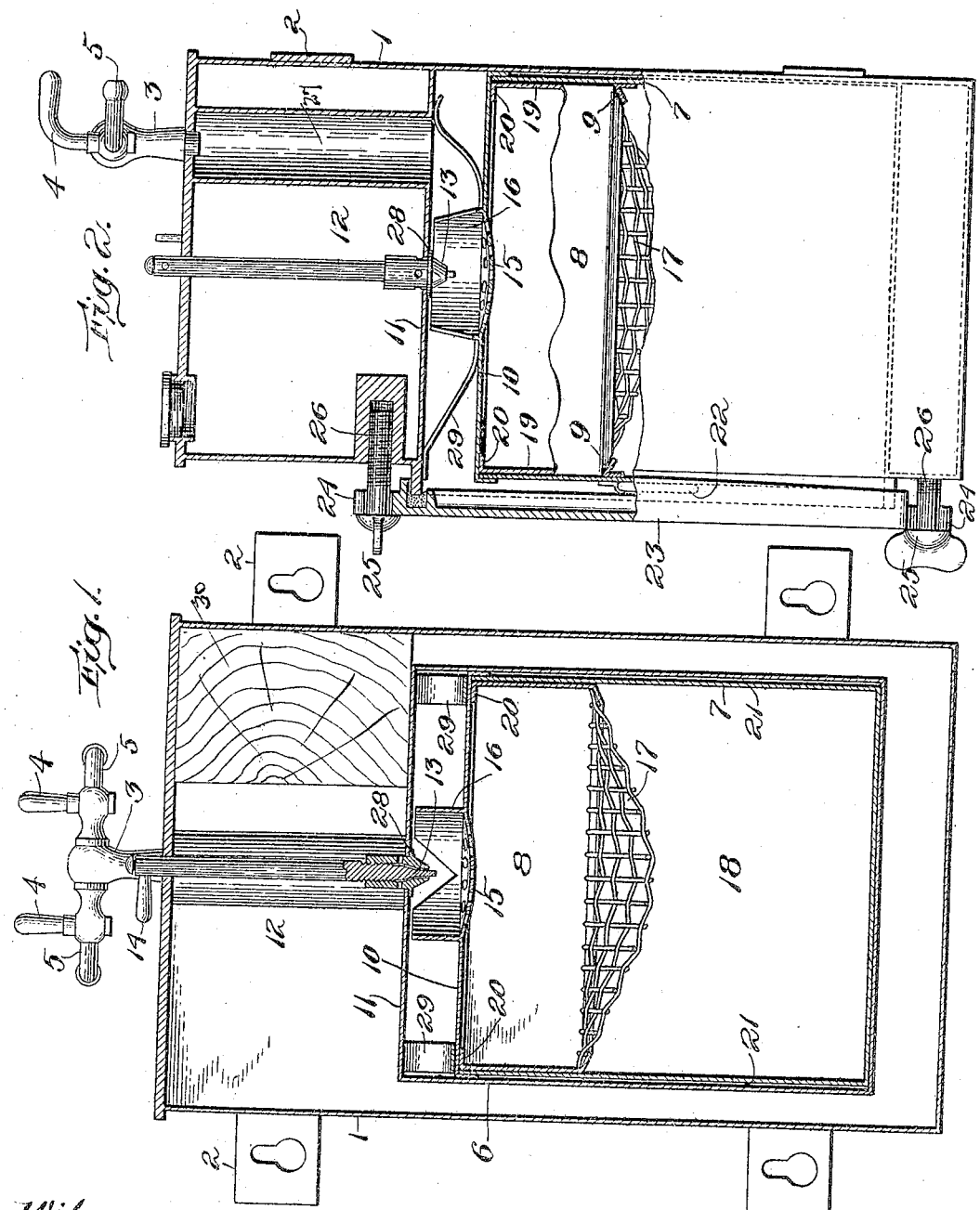

JAMES R. SHIRREFFS, OF AMESBURY, MASSACHUSETTS.

ACETYLENE-GAS GENERATOR.

No. 820,993.  Specification of Letters Patent.  Patented May 22, 1906.

Application filed October 21, 1905. Serial No. 283,723.

*To all whom it may concern:*

Be it known that I, JAMES R. SHIRREFFS, a citizen of the United States, residing at Amesbury, in the county of Essex and State of Massachusetts, have invented an Improvement in Acetylene-Gas Generators, of which the following description, in connection with the accompanying drawings, is a specification, like numerals on the drawings representing like parts.

The object of my invention is to provide a generator adapted for use with automobiles or wherever a portable generator is required and capable of automatically delivering a continuous, steady, and uniform supply of gas to the lamps.

Among the principal objections which it is my purpose to obviate are the present tendency of the flames in the lamps to fluctuate, due to the uneven production of the gas, and the present tendency to produce excessive moisture and steam in connection with the gas, and I accomplish these objects by providing means for maintaining the water-pressure cool and exactly counterbalancing in quantity and head the gas-pressure and by separating the vapor condensation from access to the carbid-chamber and by preventing the rising of the dust and keeping entirely clean at all times the valves, tubes, and tips, as well as the inner chamber, which contains the carbid receptacle or chamber.

I have discovered that by exactly counterbalancing the normal gas-pressure and water-pressure and by confining the water-delivery and carbid opening to a very small area the supply of gas will be automatically regulated and maintained even and without fluctuating tendency, notwithstanding the jolting which the motor-car may give. My construction also results in economy of production and use, means being provided not only for causing all condensation to drip outside of the carbid, but to prevent its access to the latter, while directing all the water from the supply-valve directly on the carbid, the latter being contained in a removable basket or receptacle carried in a removable box so proportioned as to contain the exact amount of calcium carbid proper for the water-supply and to receive all the ashes from said amount of carbid without interference with the supply of the latter, the construction being such as to facilitate the ready removal of the carbid and the maintenance of the water-supply properly cool, so as not to interfere with the continuous running of the generator.

My invention also includes various other advantages besides those above mentioned, which will appear in the course of the following description, reference being had to the accompanying drawings, in which I have shown a preferred embodiment of my invention.

In the drawings, Figure 1 is a central vertical sectional view of the essential features of the generator, and Fig. 2 is a similar sectional view taken in a transverse plane to the preceding figure.

I have shown my invention embodied in such size and shape as is practical for use with automobiles or motor-cars, the same comprising an outer rectangular shell or casing 1, provided with suitable retaining devices, such as lugs 2, and having a delivery-pipe 3 and controlling-cocks 4 for pipes 5. Within the shell or casing 1 I provide an inner gas-chamber 6 for removably receiving the carbid chamber or receptacle 7, which contains a carbid holder or basket 8, seated on ledges 9 and retained by a cover 10. The inner gas-chamber 6 has a top wall 11, which constitutes a division-wall or bottom for the water-receptacle, said chamber 6 being separated at the sides and bottom of the casing 1 merely sufficiently to permit the circulation of a small amount of water around the inner chamber for cooling purposes. The space 12 above the wall 11 constitutes the water chamber or tank or source of water-supply, controlled by a needle-valve 13, operated by a handle 14, and is of such size and height as to give a water supply and pressure exactly proportioned to the gas-pressure developed from the amount of carbid contained in the basket 8, so that when the basket 8 is filled with carbid and the tank 12 is filled with water and the needle-valve 13 is opened the drip of water upon the carbid will produce exactly the gas-pressure required and no more, for any increase in gas-pressure will instantly counterbalance the water-pressure and prevent the further flow of the latter; but the moment that the gas-pressure lowers the water will flow and restore the gas-pressure. A number of other constructional details coöperate to produce this result, which result I regard as one of the most valuable features of my invention. The cover 10 is provided with a small perforated opening 15, inclosed by a raised wall or collar 16, the rest of the cover being tightly closed over the pan or receptacle 7, which constitutes the carbid-chamber. The carbid basket or holder has an open-mesh bottom 17 sloping downwardly to the center in alinement with the center of the opening 15, thereby tending to maintain the mass of carbid in central position beneath the needle-valve 13 and opening 15. The result of this construction is that as the water drips on the carbid, thereby instantly generating acetylene gas and at the same time producing more or less steam, the gas and steam rush through the small perforated opening 15 and at once strike against the cold bottom 11 of the water-tank, where the usual condensation takes place; but inasmuch as the opening 15 is small and the entire remaining portion of the carbid-chamber is tightly covered the dripping of the condensation cannot fall upon the carbid, (which has heretofore produced an uneven moistening of the latter, and hence a fluctuating generation of gas,) but falls on the cover and runs down the sides of the carbid-chamber. The wall or collar 16 extends so close to the bottom of the water-tank as to make it impossible for this condensation to flow back to the carbid.

In the old construction the condensation has been free to drop onto the carbid, and the carbid has been free to be jolted by the vehicle into contact with the water-chamber, thereby striking against the drops of condensation, producing an excess of gas for the moment, with resultant flickering of the lamps, and also tending to plug and stop up the valves and gas tips and tubes with the dust and paste ascending from the jolting of the carbid against the water-tank.

My construction separates the condensation from all possible reach of the carbid and prevents the jolting of the carbid against the water-tank. Also the small diaphragm or perforated opening 15 prevents the carbid-dust from going out to the valves, &c., as I have found that by making this opening small and restricting it to the area directly beneath the valve 13 and forming it as shown it becomes immediately coated on its under side with a porous residuum or paste-like layer from the carbid, which distributes the water and serves the double purpose of preventing the sharp drip of the water directly on the carbid, which would otherwise take place, and also prevents the rising of the dust, keeps the gas-chamber 6 clean, and retains all dirt in the carbid-chamber 7.

A further feature of my invention resides in preventing the distribution of ashes by proportioning the carbid-receptacle so that the lower part 18 thereof or ash-box will receive all the ashes from the carbid without piling up into the basket, as heretofore. I have found that by making the parts proportioned as shown this result is accomplished, the ash-box being approximately two and one-half times or more the size of the basket or tray. By this means no skill whatever is required in using the generator; but the operator simply fills the tray with carbid and the tank with water and after the parts are put together opens the valve, and thereafter the apparatus will run perfectly without attention until entirely exhausted.

It is frequently desirable to be able to remove the carbid instantly from the generator, and accordingly I have provided the tray 8 with walls 19, extending flush with the top of the chamber 7, and with inturned edges 20, which can be instantly caught by the fingers and the tray removed without interfering with the tight closing of the carbid-chamber.

A further important feature of construction resides in providing a dead-air space 21, which constitutes means for preventing the water from becoming heated. I accomplish this by making the chamber 7 bodily removable from the inner chamber 6. The separate wall of the carbid basket or tray also helps toward this end. When the carbid is thrown directly into the chamber against the water-tank, the intense heat caused by the generation of the gas quickly raises the water to substantially a boiling-point and not only interferes with the proper working of the apparatus, but produces an excess of steam in the gas, thereby clogging and interfering with the free working of the lamps. I have found that for proper automatic and continuous running it is necessary to keep everything as cool as possible, and accordingly I have provided the means just described, which effectually prevents the water from rising to an undue temperature. While I have provided two walls to intervene between the carbid and the water-chamber, one wall is usually sufficient. The carbid-chamber 7 is provided with a ring 22 or other means for pulling it out through an opening in the front or side of the generator, as preferred, said opening being normally closed by a heavy cap or door 23, fitted with a rubber gasket, whose ears or hook-like lugs 24 catch beneath the heads 25 of thumb-screws 26, set into the casing 1. The gas escapes from the inner chamber 6 to the delivery-pipe 3 by a free passage 27. I have found it desirable to secure the outer portion of the valve-seat against the under side of the water-tank, and accordingly I provide it with an annular flange 28, which is soldered against the under side of the part 11. At the opposite sides of the valve springs 29 are secured at their front ends to the bottom 11 of the water-tank to engage the cover 10 and hold the carbid-receptacle immovably in place. In order to get the right proportions of the water-tank to the carbid-chamber and yet maintain the rectangular external appearance of the generator, I find it advisable to insert a block or other water-displacing means 30, which occupies a portion of the space of the water-tank, thereby raising the water to the desired height without increasing the quantity beyond that required. For one and one-half pounds of carbid I provide two and five-eighths inches head and twenty-eight ounces of water, the proportions of parts being substantially as shown in the drawings, which I have undertaken to make approximately to scale.

I have already sufficiently described the operation of my device in the course of the above explanation of its construction.

My construction maintains neatness and prevents the valves and various passages, corners, &c., from becoming clogged or fouled with the carbid residue. At the same time every part of the apparatus may be readily cleaned; but the most important feature of my invention is due to my discovery that simply by so proportioning the parts that the gas-pressure will counterbalance the water-pressure an automatic, continuous, and uniform flow of gas can be produced, the separate inclosing walls of the carbid maintaining the apparatus cool and preventing an undue amount of steam, and the cover and collar construction preventing the escape of dust and the access of condensation. My object is to provide a generator so constructed that it can be properly run by the novice without attention or skill. All that he is required to do is simply to fill the basket with carbid and the tank with water and then turn the valve-handle 14, whereupon it will continue to work properly until all the carbid and available water have been used.

I have succeeded in providing an apparatus in which the carbid capacity of the basket and the water capacity of that portion of the water-tank which supplies water to said basket are so proportioned that when started with both full the apparatus will run automatically and both the carbid and said water will become exhausted at the same time and the ashes in the ash-box will be substantially dry. I believe I am the first to have invented an apparatus capable of accomplishing this result. It is desirable to have the external walls of the casing 1 extend straight up from the bottom to the top of the apparatus; but with such a construction the water-chamber would have too large a capacity above the carbid-basket, and accordingly in order to retain said external construction and yet have the right head of water, as well as capacity of water, it becomes necessary to insert the block 30 or otherwise decrease the capacity and raise the head or depth of the water. If the head or depth of water which I have described were not provided and the block 30 were omitted, (in that shape of apparatus herein shown,) the ashes would be soaked with water, provided the apparatus was left to run itself. In other words, the apparatus would not properly operate automatically. The heavy cap or door is then quickly removed, the box 7 pulled out, the cover 10 slipped off, the carbid-basket 8 lifted out by its edges 20, and the ashes dumped from the lower portion 18. The basket 8 is then refilled with carbid and again put in place, the cover restored, and the box shoved back into the inner chamber 6, the cap secured, and the tank filled with water ready for use again.

I am aware that many changes may be resorted to without departing from the spirit and scope of my invention.

Having described my invention, what I claim as new, and desire to secure by Letters Patent, is—

1. An acetylene-gas generator, comprising a water-tank, a regulating-valve therefor, an inner gas chamber or cavity within and surrounded by said water-tank, and a removable carbid-chamber fitting within said gas-chamber and having a carbid-basket in its upper portion for restricting the carbid to said upper portion, the lower portion constituting an ash-box, and a closing-cover, said cover having a small perforated approximately horizontal opening beneath said valve and a surrounding wall extending approximately to the bottom of the water-tank but disconnected therefrom.

2. An acetylene-gas generator, comprising a water-tank, a regulating-valve therefor, an inner gas chamber or cavity formed in the midst of said water-tank and surrounded by the latter, and a carbid-chamber sliding removably into said gas-chamber, means for maintaining said carbid-chamber stationary against all jolting movements in use, said carbid-chamber having a permanently-closed lower portion constituting an ash-box and having at its upper portion a vertically-removable carbid-basket, provided with a wide-mesh open-work bottom through which the ashes may freely fall, said carbid-chamber being permanently closed excepting at its top, and having a closing top cover.

3. An acetylene-gas generator, comprising a water-tank, a regulating-valve therefor, an inner gas chamber or cavity formed in the midst of said water-tank and surrounded by the latter, and a carbid-chamber sliding removably into said gas-chamber, said carbid-chamber having a permanently-closed lower portion constituting an ash-box and having at its upper portion a vertically-removable carbid-basket, provided with a wide-mesh open-work bottom through which the ashes may freely fall, said carbid-chamber being permanently closed excepting at its top, and having a closing top cover, and springs within said gas-chamber between said top cover and said tank for preventing a jolting movement of the carbid-chamber within said gas-chamber.

4. An acetylene-gas generator, comprising a water-tank, an inner gas-chamber set laterally, from one side of the generator, into the midst of said tank and surrounded thereby, and a laterally-removable carbid-receptacle, containing a vertically-removable carbid-basket supported within said receptacle adjacent the top thereof, said basket being provided with sides extending upwardly approximately to the top of said receptacle, the top edges of said sides being inturned slightly for engaging the fingers.

5. An acetylene-gas generator, comprising a water-tank, a laterally-removable carbid-chamber beneath said tank having a closed top fitting water-tight over said chamber and provided with a small approximately horizontal perforated opening, a drip-valve from said tank terminating above said chamber in line with said opening, and a wall or collar extending up from said top about said opening and valve, affording means to permit the free escape of gas from said chamber into the space between said top and said water-tank, and approximately cutting off the access to said chamber of all moisture except from said valve, said wall or collar extending up approximately to the bottom of said tank and having its top edge notched to permit its lateral removal past said valve.

6. An acetylene-gas generator, comprising an external casing having an opening in its side, located toward the lower portion of said side and terminating short of the bottom and vertical edges of said side, an inner casing extending inwardly from said opening within said external casing, leaving a space to constitute a water-tank, immediately above and at the opposite sides and bottom of said inner casing, said inner casing constituting a gas-chamber, a carbid-receptacle mounted to slide endwise through said opening into said gas-chamber, yielding means for holding said carbid-receptacle approximately down on the bottom of said gas-chamber, a gas-tight cap or door removably closing said opening, and a drip-valve located in the top wall of said inner casing to permit water to drip from said water-tank to said carbid-receptacle, said water-tank above the inner casing holding the exact amount of water necessary for exhausting the carbid of said receptacle when full, and having the exact depth to provide the head of water required for giving, by gravity alone, a normal working pressure to the gas generated from said carbid.

7. An acetylene-gas generator, comprising an external casing having an opening in its side, located toward the lower portion of said side and terminating short of the bottom and vertical edges of said side, an inner casing extending inwardly from said opening within said external casing, leaving a space to constitute a water-tank, immediately above and at the opposite sides and bottom of said inner casing, said inner casing constituting a gas-chamber, a carbid-receptacle mounted to slide endwise through said opening into said gas-chamber, a gas-tight cap or door removably closing said opening, and a drip-valve located in the top wall of said inner casing to permit water to drip from said water-tank to said carbid-receptacle, said water-tank above the inner casing holding the exact amount of water necessary for exhausting the carbid of said receptacle when full, and having the exact depth to provide the head of water required for giving, by gravity alone, a normal working pressure to the gas generated from said carbid.

In testimony whereof I have signed my name to this specification in the presence of two subscribing witnesses.

JAMES R. SHIRREFFS.

Witnesses:
ROBERT B. WARDROP,
SAMUEL A. FELCH.